INVENTOR.
Gordon G. Bonvallet

AGENT

United States Patent Office 3,343,467
Patented Sept. 26, 1967

3,343,467
REFLEX MARKER
Gordon G. Bonvallet, Corning, N.Y., assignor to Corning Glass Works, Corning, N.Y., a corporation of New York
Filed Mar. 29, 1965, Ser. No. 443,581
8 Claims. (Cl. 94—1.5)

ABSTRACT OF THE DISCLOSURE

A reflex highway marker in the form of a glass body having an incident surface projecting above the surface of a highway and a reflecting surface located below the surface of the highway. The surfaces are surfaces of revolution about a common axis and are of such configuration that light falling on the incident surface at angles of elevation between $-2°$ and $+11°$ is focused in the vicinity of the reflecting surface. The incident and reflecting surfaces are provided at selected locations with color filters capable of imparting to reflected light colors defining the direction of approach of a vehicle.

---

This invention relates to reflex lenses adapted for delineating vehicle paths, such as highways and driveways, by redirecting back toward an oncoming vehicle substantial amounts of the light emitted by the headlights of the vehicle. In particular, the invention relates to such lenses having the ability to indicate to the driver of an approaching vehicle a signal the color of which is a function of the direction of approach of the vehicle.

This invention constitutes an improvement on the reflex marker disclosed in the copending application of Franklin M. Neal, Ser. No. 423,198, filed Jan. 4, 1965.

It is an object of the present invention to provide a reflex marker suitable for use both to delineate a vehicle path and to define, by means of the color of the reflected light, the direction from which a vehicle is approaching the marker.

This and other objects, which will be apparent from the detailed description of the invention, are accomplished, according to one embodiment of the invention, by the provision of a solid transparent body comprising a base portion and a top portion, at least the top portion projecting slightly above the surface of a vehicle path, the top portion having an incident surface capable of substantially focusing an incident light beam on a reflecting surface formed on the base portion, at least one of the incident and reflecting surfaces being provided at selected locations with color filters capable of imparting to the reflected beam colors defining the direction of approach of the vehicle.

The invention will be described with reference to the accompanying drawing, illustrating a preferred embodiment of the invention, in which.

Figure 1:
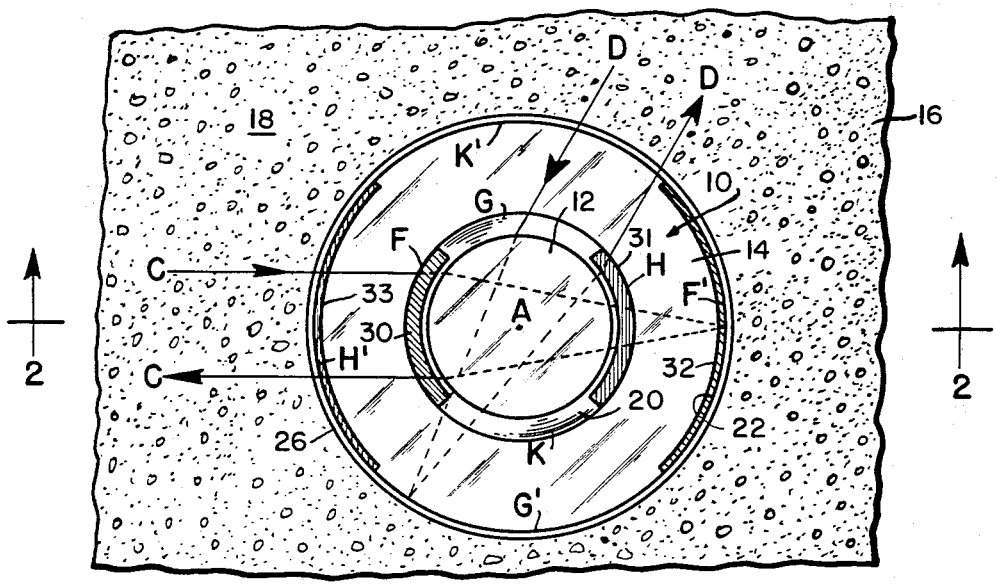
FIGURE 1 is a top plan view of a highway marker according to the invention.

As described in the above-identified Neal application, the lens employed in the present invention is a transparent solid glass body 10 comprising top portion 12 and base portion 14. Top portion 12 extends substantially above the top surface 16 of a highway, while bottom portion 14 is substantially recessed within the main body 18 of the highway. Light emitted by the headlights of an automobile falls upon annular incident surface 20, passes through the transparent glass body 10, is reflected by a reflecting surface such as inner surface 22 of silver coating 26, and emerges from the lens in the direction of the vehicle from which the light originated.

Incident surface 20 and reflecting surface 22 are designed such that beams of light falling upon the incident surface at angles of elevation within the range characteristic of light rays emitted by automobile headlights, i.e., light beams within the range of angles of elevation between $-2°$ and $+11°$, will be focused at points the locus of which substantially defines the reflecting surface of the marker. Thus, such light rays will be redirected back in the direction of the vehicle along substantially the paths of the incident light rays. Since the incident and reflecting light surfaces are surfaces of revolution about axis A, the lens will be horizontally nondirectional, that is, light rays within the vertical angular limits of acceptance will be reflected back substantially in the direction of their origin regardless of the horizontal angles at which the rays fall upon incident surface 20. This phenomenon is illustrated in FIGURE 1, wherein light rays C and D falling upon incident surface 20 at the bottom and top thereof, respectively, and at differing horizontal angles are each reflected back toward their origin.

Figure 2:
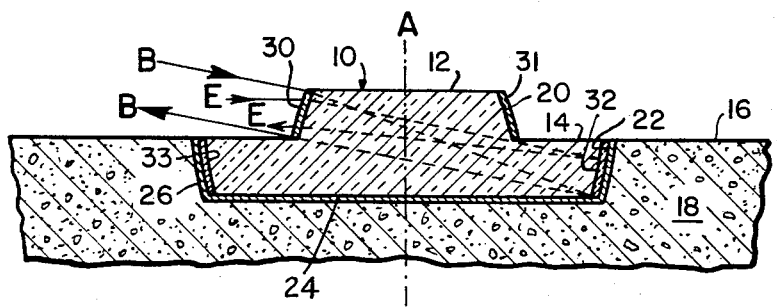
FIGURE 2 is a sectional view taken on line 2—2 of FIGURE 1.

The effects of the combined incident and reflecting surfaces of the lens on incident light beams within the range of angles of elevation between $-2°$ and $+11°$ is illustrated in FIGURE 2. A beam defined by rays designated as B—B falling on incident surface 20 at an angle of elevation of 11° above the horizontal will be focused approximately on reflecting surface 22 and near the bottom thereof. Similarly, a beam defined by rays E—E falling on surface 20 at an angle of elevation of $-2°$ will impinge upon surface 22 near the top thereof. Incident light radiation at angles of elevation within this range will be focused substantially on surface 22 at locations intermediate between the locations of the foci of the beams defined by rays B—B and E—E.

If incident light beams were focused precisely upon reflecting surface 22, the light beams would be reflected by the lens back along precisely their incident paths, thus redirecting the light back into the headlight of the approaching vehicle. In order to avoid this and to cause a substantial portion of the light to be directed toward the eyes of driver of the vehicle, incident surface 20 and reflecting surface 22 are formed such that the reflecting surface is displaced from the actual locus of the foci of beams of incident radiation by an amount sufficient to provide a controlled amount of spread in the reflected beam. This is accomplished, for example, by the formation of incident surface 20 and reflecting surface 22 such that the intersections of such surfaces and vertical planes through axis A, about which the incident and reflecting surfaces are surfaces of revolution, form arcs of circles. Thus spherical aberration will impart vertical spread to the reflected beam. Horizontal spread will result from the fact that the incident and reflecting surfaces are circular in horizontal cross section.

The exact dimensions of the lens may vary and may be determined in accordance with the description of the above-identified Neal application, which description is herein incorporated by reference.

The present invention involves the selective application of color-modifying means to at least one of the incident and reflecting surfaces in order to cause light reflected back by reflex action by the lens to be colored in accordance with the location of the light source.

The invention is illustrated in the drawing as embodied in a reflex lens having its incident surface 20 and reflecting surface 22 each divided into four sectors, F, G, H, and K, and F', G', H', and K', respectively. Sector F is provided with a color-modifying coating 30 having the ability to permit the passage of substantially only green light, while sector H is provided with a coating 31 having the ability to transmit substantially only red light. Sectors G and K are not coated, and, accordingly, these sectors of the incident surface transmit light of all wavelengths. Sector F' of the reflecting surface is provided with a green color-modifying coating similar to coating 30, and sector H' of the reflecting surface is provided with a red color-modifying coating similar to coating 31. Sectors G' and K' are not provided with color filter coatings, but are provided only with silver reflecting coating 26, which surrounds the entire lens, including the coatings on sectors F' and H'.

Due to the fact that coatings F and F' have the ability to transmit green light, while preventing the transmission of all other colors, rays of light, such as ray C, will fall on sector F of incident surface 20, passing through green color-modifying coating 30, and be reflected from reflecting surface 22 after passing through green color-modifying coating 32. The ray will then once again traverse both coating 32 and coating 30 and emerge as indicated by the arrows. Thus, whereas incident light ray C may be substantially white light, emergent ray C will contain substantially only green light. Similarly, light beams incident on sector H of surface 20 will appear substantially red upon reflection.

It will be appreciated that light rays falling upon incident surface 20 in the vicinity of the boundaries between the various sectors, may enter either a colored or a clear sector and emerge from a sector of the other type. For example, ray D—D, incident upon clear sector G is not filtered until it re-emergence from red sector H. Due to the fact that ray D—D is filtered only once, the color of the emergent ray will not be as pure as that of a ray which both enters and emerges from sector H. Since color filters do not operate with 100% efficiency, i.e., less than 100% of radiations of undesired wavelengths are filtered at each pass of a beam of light therethrough, the presence of filter coatings on both the incident and reflecting surfaces of the lens enhances the purity of the reflected light, while, however, decreasing the intensity thereof. Accordingly, depending upon the degree of purity and the intensity required, either the incident surface or the reflecting surface, or both, may be provided with color-modifying coatings.

The illustrated combination of coated and uncoated sectors on the respective incident and reflecting surfaces of the lens render the lens particularly useful for indicating direction of travel along a highway. For example, if the center line of the street in which the marker is embedded coincides with line 2—2 of FIGURE 1, sector F will be exposed to the light emitted by the headlights of vehicles traveling in the righthand direction in FIGURE 1, while sector H will be exposed to light emitted by the headlights of vehicles traveling to the left. If, for example, the street is a one-way street where traffic is permitted to travel only in the righthand direction, this fact will be indicated by the green reflected light observed by drivers of vehicles traveling in this direction, while drivers of vehicles traveling in the prohibited lefthand direction will observe red light reflected from the device. Thus, a device of the type illustrated is a substantial aid to safety, since drivers are apprised not only of the fact that the street is a one-way sreet, but also of the propriety of their direction of travel. Vehicles approaching the marker from directions transverse to the center line of the highway, such as vehicles approaching from side streets, will direct light onto sectors G and K, and thus the drivers of such vehicles will see substantially white reflected light.

In a preferred embodiment, when reflex action is desired within angles of elevation varying between −2° and +11°, and when lens 10 comprises a glass having an index of refraction of 1.523, the marker has the following characteristics: Incident surface 20 has diameters of 0.675 inch at the top thereof and 0.820 inch at the bottom thereof. Reflecting surface 22 has diameters of 1.500 inches at the top thereof and 1.440 inches at the bottom thereof. Each of top portion 12 and bottom portion 14 is 0.187 inch in height. Top portion 12 and bottom portion 14 are formed generally in the shape of truncated cones having contiguous bases. Such basic conical shape is modified, however, by superimposition thereon of a vertical convex outward curvature, the radii of vertical curvature for the incident and reflecting surfaces being respectively 0.412 inch and 1.416 inches. Bottom surface 24 of the marker may have a reflecting silver coating thereon in order to reflect stray ambient radiation, thereby augmenting the reflex action of the lens. The green and red color-modifying coatings used on the marker may be color filters comprising well-known organic dyes, ceramic frits or stains applied using suitable vehicles.

Figure 3:
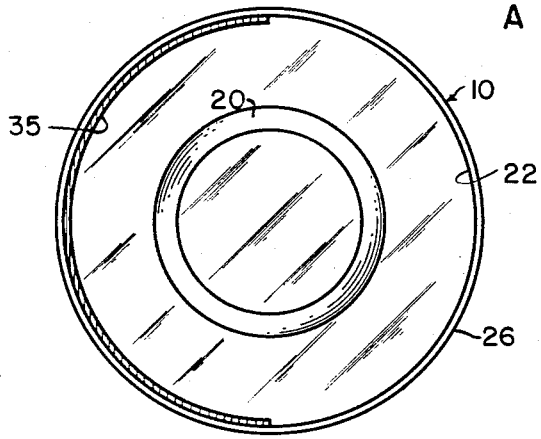
FIGURE 3 is a top plan view of an alternative form of a highway marker according to the invention.

A further embodiment of the invention is illustrated in FIGURE 3. In this embodiment, the lens 10 is provided with a reflecting surface 22 formed on silver coating 26, while incident surface 20 is a clear uncoated surface. A red color filter coating 35 is applied along 180° of the reflecting surface, between the surface of the glass and the silver coating. Such arrangement is useful in delineating one-way streets, where it is desirable to reflect the maximum amount of light in the direction of vehicles approaching the marker in the permitted direction of travel. Since there is no filtering of light which falls on the uncoated sector of the reflecting surface, such light is reflected by the marker with maximum efficiency. Due to the fact that the red filter coated sector extends for 180° about the incident surface, the filtering effect of the sector extends through wider angles than those for which the filtering sectors of the embodiment of FIGURE 1 are operative.

The color-modifying action of the coatings applied to the various sectors of the respective surfaces of the present lens may depend upon the filtering out of undesired wavelengths during passage of light therethrough, as in the case of the above-described coatings, or the coatings on the reflecting surface of the lens may be specular reflecting coatings having the ability to reflect certain wavelengths of light, while absorbing others. The color-modifying means may comprise either coatings applied to the surface of the lens or stains which become an integral part of the glass.

It will be appreciated that varying configurations of color-modifying means may be applied to the present invention, and that such configurations may be utilized to indicate horizontal directions of approach throughout 360° about the marker. Accordingly, it is intended that the scope of the present invention be limited not to the precise configurations illustrated in the preferred embodiments of the invention, but rather only by the scope of the appended claims, in which the term "plane" is used to indicate an imaginary plane of reference, rather than a surface of the lens.

I claim:

1. A reflex lens comprising a solid transparent body having an incident surface and a reflecting surface, said surfaces being surfaces of revolution about a common axis and being on opposite sides of a plane perpendicular to said common axis, the intersections of each said surface with planes through said common axis being outwardly convex, each said surface sloping away from said plane towards said common axis, at least one of said incident and reflecting surfaces having at least one sector provided with filter means for modifying the perceptible color of light falling upon said surface and reflected by said lens so as to differ from the perceptible color of light falling on at least one other sector of the same said surface and reflected by said lens.

2. A reflex lens according to claim 1 in which said filter means is on said incident surface.

3. A reflex lens according to claim 1 in which said filter means is on said reflecting surface.

4. A reflex lens comprising a transparent solid body having an incident surface and a light-reflecting surface, said surfaces being surfaces of revolution about a common vertical axis, said surfaces being on opposite sides of a plane perpendicular to said axis, said surfaces sloping outwardly in the direction of said plane, each said surface being outwardly convex in vertical cross section and being of a configuration such that beams of light falling on said incident surface at angles of elevation from the horizontal varying between −2° and +11° are focused in the vicinity of said reflecting surface, and said reflecting surface and said incident surface cooperate to redirect said beams of light in the general direction of the origin thereof, at least one of said incident and reflecting surfaces having at least one sector thereof provided with filter means for modifying the perceptible color of light falling upon said surface and reflected by said lens so as to differ from the perceptible color of light falling on at least one other sector of the same said surface and reflected by said lens.

5. A reflex marker for a vehicle path comprising a transparent solid body having an incident surface projecting above a surface of said ptah and a reflecting surface below the surface of said path, said surfaces being surfaces of revolution about a common axis, said incident surface sloping upwardly toward said axis and said reflecting surface sloping upwardly outward from said axis, each said surface being outwardly convex in vertical cross section and being of a configuration such that beams of light falling on said incident surface are focused in the vicinity of said reflecting surface, and said reflecting surface and said incident surface cooperate to redirect said beams of light in the general direction of the origin thereof, at least one of said incident and reflecting surfaces having at least one sector thereof provided with filter means for modifying the perceptible color of light falling upon said surface and reflected by said lens so as to differ from the perceptible color of light falling on at least one other sector of the same said surface and reflected by said lens.

6. A reflex marker according to claim 5 in which said one of said incident and reflecting surfaces is said incident surface.

7. A reflex marker according to claim 5 in which said one of said incident and reflecting surfaces is said reflecting surface.

8. A reflex marker according to claim 5 in which each of said incident and reflecting surfaces has at least one first sector thereof provided with means for modifying the perceptible color of light falling upon said surface and reflected by said lens so as to differ from the perceptible color of light falling upon at least one other said sector of the same said surface and reflected by said lens, said first sector of said incident surface and said first sector of said reflecting surface being located with respect to one another such that light falling upon said first sector of said incident surface passes through said transparent body and is reflected from said first sector of said reflecting surface.

References Cited
UNITED STATES PATENTS 2,329,171  9/1943  Russ _____ 94—1.5

FOREIGN PATENTS 405,471  2/1934  Great Britain.

JACOB L. NACKENOFF, *Primary Examiner.*